(12) United States Patent
Lyle

(10) Patent No.: US 9,390,442 B2
(45) Date of Patent: Jul. 12, 2016

(54) CAPTURING OF UNIQUE IDENTIFIER IN M-COMMERCE TRANSACTION

(75) Inventor: Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 13/347,688

(22) Filed: Jan. 10, 2012

(65) Prior Publication Data

US 2013/0179285 A1 Jul. 11, 2013

(51) Int. Cl.
*G06Q 30/00* (2012.01)
*G06Q 30/06* (2012.01)
*G06Q 20/32* (2012.01)

(52) U.S. Cl.
CPC ............ *G06Q 30/06* (2013.01); *G06Q 20/3227* (2013.01)

(58) Field of Classification Search
CPC .......................................... G06Q 30/06–30/08
USPC ................................ 705/26.1–27.2
See application file for complete search history.

(56) References Cited

U.S. PATENT DOCUMENTS

| | | | |
|---|---|---|---|
| 7,165,052 B2 | 1/2007 | Diveley et al. | |
| 7,917,446 B2 | 3/2011 | Atkinson | |
| 2003/0144956 A1 | 7/2003 | Yu, Jr. et al. | |
| 2005/0039057 A1* | 2/2005 | Bagga et al. | 713/202 |
| 2011/0087596 A1 | 4/2011 | Dorsey | |
| 2011/0119190 A1* | 5/2011 | Mina | 705/44 |
| 2013/0046645 A1* | 2/2013 | Grigg et al. | 705/26.1 |

OTHER PUBLICATIONS

IBM; "Method to Capture and Playback Binary Unique Data in Test Tools"; http://www.ip.com/pubview/IPCOM117690D; Mar. 13, 2003.
IBM; "Method & System to Filter, Analyze and Statistics Transaction's Performance of Database"; http://www.ip.com/pubview/IPCOM000154898D; Jul. 17, 2007.
Google Wallet with PayPass/MasterCard; http://www.mastercard.us/google-wallet.html?cmp=psc.wallet.ggle.

* cited by examiner

*Primary Examiner* — Ethan D Civan
(74) *Attorney, Agent, or Firm* — North Shore Patents, P.C.; Michele Liu Baillie

(57) ABSTRACT

In obtaining data for a financial transaction between a mobile device and a merchant device, the merchant device: receives data obtained from the mobile device during the financial transaction between the mobile device and the merchant device, where the data comprising a unique identifier from a mobile device user; associates the data with a record of the financial transaction; stores the record of the financial transaction with the associated data; and sends a copy of the stored record with the associated data from the merchant device to the mobile device. The merchant device may determine that the unique identifier is required from the mobile device user to complete the financial transaction and sends the request for the unique identifier to the mobile device. Both the mobile and merchant devices may be NFC-enabled devices.

19 Claims, 3 Drawing Sheets

CAPTURING OF UNIQUE IDENTIFIER IN M-COMMERCE TRANSACTION

BACKGROUND

Mobile commerce, or "M-Commerce", includes applications and services that are accessible from Internet-enabled mobile devices. In particular, M-Commerce provides the ability to use a mobile device to participate in financial transactions. Some M-Commerce services use the Near Field Communication (NFC) standard. Two NFC-enabled devices establish radio communication with each other by touching them together or bringing them into close proximity. An NFC-enabled mobile device may include an NFC chip, while another device may include an NFC chip reader. When the two devices come into close proximity, the NFC chip reader wakes up the NFC chip on the mobile device and establishes a communication link between them. Data may then be exchanged between the devices. For example, a merchant may provide a kiosk with an NFC chip reader. During a financial transaction, such as the purchase of consumer items, the mobile device user brings the NFC-enabled mobile device in close proximity to the kiosk so that the NFC chip reader in the kiosk may establish a communication link with the mobile device. Data is then exchanged between the user's mobile device and the kiosk, such as information for authentication and payment account information. Upon conclusion of the financial transaction, a paper or electronic receipt may be generated and provided to the user or the user's mobile device.

However, unlike a traditional commercial transaction, current M-Commerce applications do not provide the ability to obtain a unique identifier from the user at the time of the financial transaction.

SUMMARY

According to one embodiment of the present invention, a method for obtaining data for a financial transaction between a mobile device and a merchant device comprises: receiving data obtained from the mobile device by the merchant device during the financial transaction between the mobile device and the merchant device, the data comprising a unique identifier from a mobile device user; and associating the data with a record of the financial transaction by the merchant device. The method further comprises: storing the record of the financial transaction with the associated data by the merchant device; and sending a copy of the stored record with the associated data from the merchant device to the mobile device.

In one aspect of the present invention, the receiving the data obtained from the mobile device by the merchant device during the financial transaction between the mobile device and the merchant device comprises: establishing a communication between the merchant device and the mobile device; determining that the unique identifier is required from the mobile device user to complete the financial transaction; sending a request for the unique identifier from the merchant device to the mobile device; and receiving the data comprising the unique identifier by the merchant device.

In one aspect of the present invention, the associating the data with the record of the financial transaction by the merchant device comprises: determining that the data satisfies the requirement for the unique identifier; and in response to determining that the data satisfies the requirement for the unique identifier, associating the data with the record of the financial transaction.

In one aspect of the present invention, the determining that the unique identifier is required from the mobile device user to complete the financial transaction and the sending the request for the unique identifier from the merchant device to the mobile device comprise: accessing one or more preset rules comprising criteria, which when met, triggers the requirement for the unique identifier; and in response to determining that the criteria of one or more preset rules are met, sending the request for the unique identifier from the merchant device to the mobile device.

In one aspect of the present invention, the method further comprises: sending a second copy of the stored record with the associated data from the merchant device to a financial institution that is a party to the financial transaction.

In one aspect of the present invention, the merchant device and the mobile device are each a near field communication (NFC) enabled device.

System and computer program products corresponding to the above-summarized methods are also described and claimed herein.

DETAILED DESCRIPTION

Figure 1:
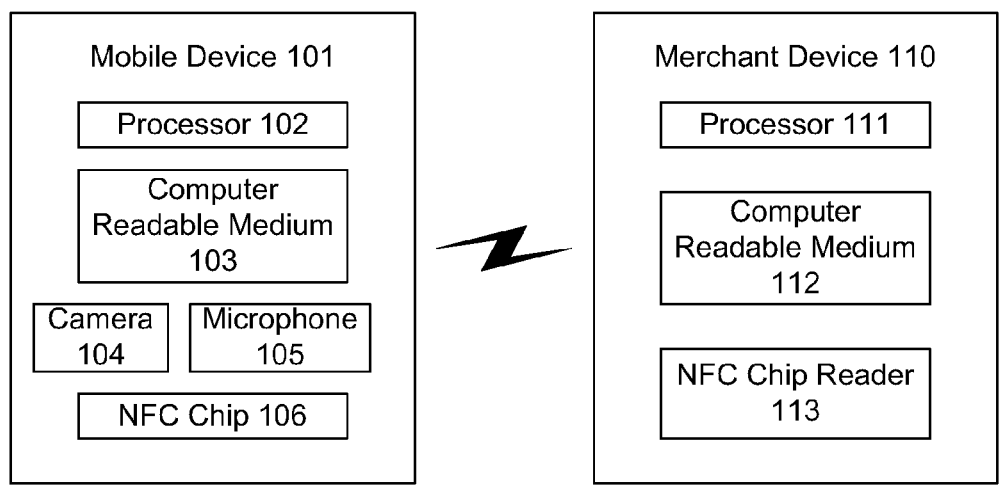
FIG. 1 illustrates an embodiment of a system for capturing a unique identifier from a mobile device user during a financial transaction according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for capturing a unique identifier from a mobile device user during a financial transaction according to the present invention. The system comprises a mobile device 101 and a merchant device 110. In this embodiment, both the mobile device 101 and the merchant device 110 are NFC-enabled devices. The mobile device 101 is operationally coupled to a processor 102 and a computer readable medium 103. The merchant device 110 is operationally coupled to a processor 111 and a computer readable medium 112. The computer readable medium 112 of the merchant device 110, alone or in combination with the computer readable medium 103 of the mobile device 101, stores computer readable program codes for implementing the method of the present invention. The processor 111 of the merchant device 110, alone or in combination with the processor 102 of the mobile device 101, executes the program code to capture a unique identifier from a mobile device user during a financial transaction between the mobile device 101 and the merchant device 110 according to the various embodiments of the present invention.

Figure 2:
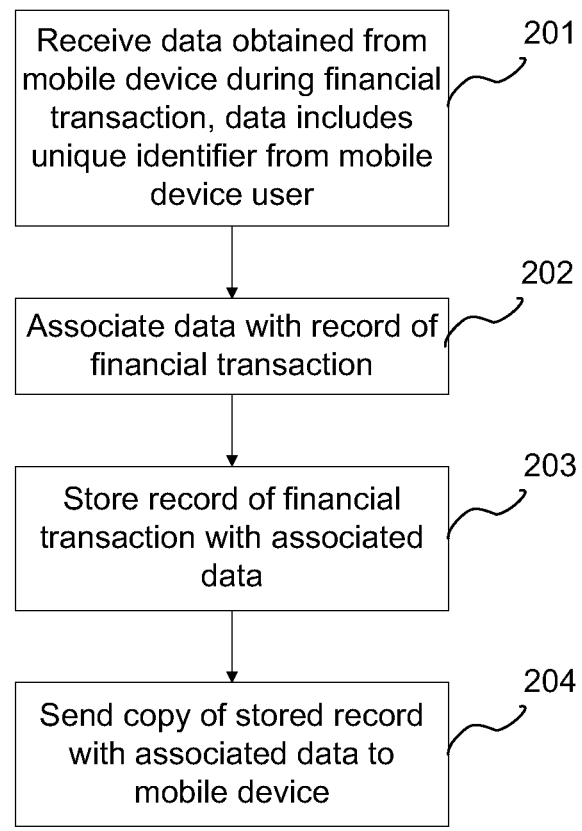
FIG. 2 is a flowchart illustrating an embodiment of a method for capturing a unique identifier from a mobile device user during a financial transaction according to the present invention.

FIG. 2 is a flowchart illustrating an embodiment of a method for capturing a unique identifier from a mobile device user during a financial transaction according to the present invention. In this embodiment of the method, the merchant device 110 receives data obtained from the mobile device 101 during a financial transaction between the merchant device 110 and the mobile device 101, where the data includes a unique identifier from the mobile device user (201). The merchant device 110 associates the data with a record of the financial transaction (202), and stores the record of the financial transaction with the associated data (203). The merchant device 110 then sends a copy of the stored record with the associated data to the mobile device 101 (204).

The unique identifier may be, for example, a signature, a photo, a voice sample of the mobile device user, or biometric information from the mobile device user. The mobile device may activate its screen, camera, or microphone and prompt the mobile device user to provide the unique identifier. The record of the financial transaction may be, for example, a paper receipt or an electronic receipt. A copy of the paper receipt may be printed along with the signature or photo of the mobile device user. A copy of the electronic receipt may be sent along with the signature, photo, or voice sample to the mobile device user. The receipt may also be provided to other parties of the financial transaction, such as a financial institution from which funds are withdrawn for the financial transaction or a financial institution to which the funds are deposited.

Figure 3:
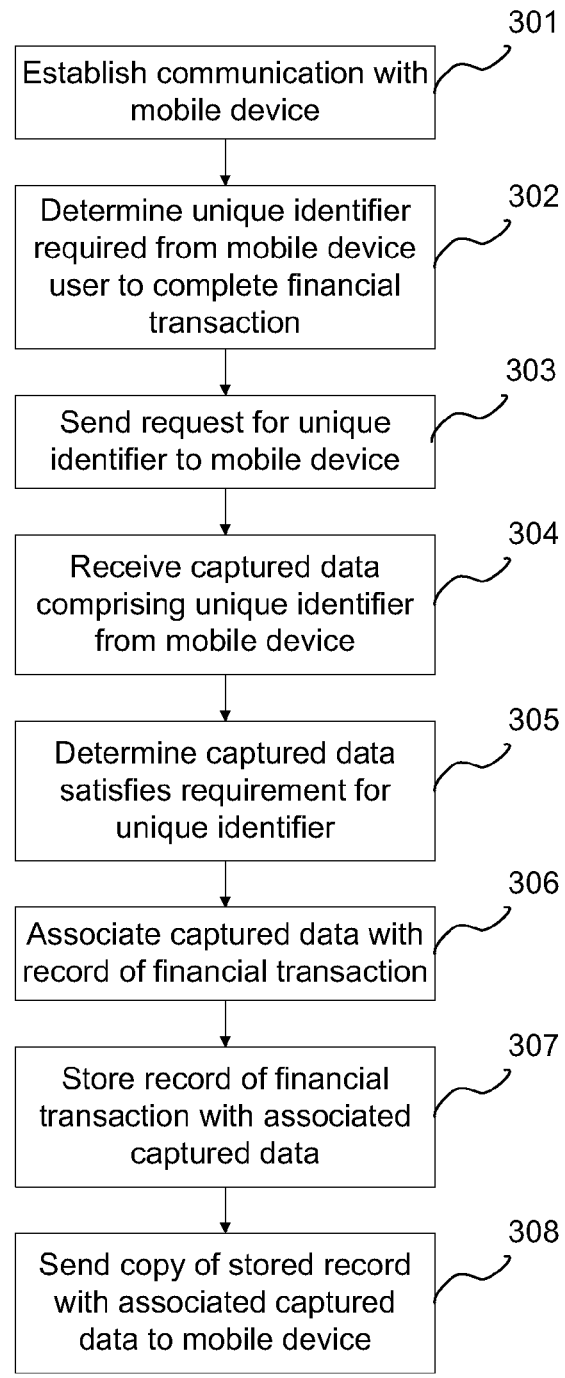
FIG. 3 is a flowchart illustrating in more detail an embodiment of a method for capturing a unique identifier from a mobile device user during a financial transaction according to the present invention.

FIG. 3 is a flowchart illustrating in more detail an embodiment of a method for capturing a unique identifier from a mobile device user during a financial transaction according to the present invention. In this embodiment of the method, the merchant device 110 establishes communication with the mobile device 101 for the purposes of conducting a financial transaction (301). The merchant device 110 determines that a unique identifier is required from the mobile device user in order to complete the financial transaction (302). The merchant device 110 may make this determination by accessing one or more preset rules, where each rule may set forth certain criteria triggering the requirement for a certain unique identifier. The rules may be set by the merchant, the user, or both the merchant and user. The rules may be stored at a location accessible by the merchant device 110, the mobile device 101, or both. The location may be external or internal to the merchant device 110 or the mobile device 101. The merchant device 110 may access the rules directly, or alternatively, the mobile device 101 may access the rules and send the rules to the merchant device 110.

In response to determining that the unique identifier is required, i.e., the criteria in one or more rules are met, the merchant device 110 sends a request for the unique identifier to the mobile device 101 (303). The mobile device 101 interfaces with the user to capture the requested unique identifier from the mobile device user, and sends the captured data comprising the unique identifier to the merchant device 110. The merchant device 110 receives the captured data comprising the unique identifier from the mobile device 101 (304). The merchant device 110 then determines that the captured data satisfies the requirement for the unique identifier (305). In response to determining that the captured data satisfies the requirement, the merchant device 110 associates the captured data with a record of the financial transaction (306). The record of the financial transaction is stored with the associated captured data by the merchant device 110 (307). Other information relevant to the financial transaction may also be associated and stored with the record by the merchant device. A copy of the stored record with the associated captured data can then be sent to the mobile device 101, or to any other appropriate party (308). The copy of the stored record may contain the same information as the record at the merchant device or a subset of the information. The recipient of the copy may also add information to the record, as desired for the recipient's internal processes. With the present invention, the recipients of the records of financial transactions may store a history of records and retrieve particular records along with the associated captured data for reporting or analysis.

For example, the merchant device 110 may be an NFC-enabled kiosk of a retailer comprising an NFC chip reader 113 (see FIG. 1), and the mobile device 110 may be an NFC-enabled smartphone comprising an NFC chip 106 (see FIG. 1). When the smartphone user is ready to purchase items from the retailer, the smartphone user brings the NFC-enabled smartphone in close proximity to the kiosk. The NFC chip reader 113 of the kiosk senses the NFC chip 106 of the smartphone, and in response, establishes a communication with the NFC chip 106 (301). Data is exchanged between the smartphone and the kiosk, such as data to authenticate the smartphone user's account. The smartphone user then scans the items for purchase at the kiosk. Prior to completing the purchase transaction, the kiosk determines that a unique identifier is required from the smartphone user in order to complete the purchase transaction (302). This determination may be made based on merchant-set rules or user-set rules. For example, the kiosk may dynamically set rules specifying particular types of content to be captured as part of the purchase transaction. The required content may be based on a user status, recent financial transaction activity, or some other criteria. For example, the merchant can require a photo of the smartphone user to be captured when typical items are to be purchased, while both a photo and a voice sample of the smartphone user are required to be captured when certain specialty items are to be purchased. For another example, the user may specify rules where purchases $500 or under require a photo of the smartphone user to be captured, while both a photo and a voice sample of the smartphone user are required to be captured for purchases over $500.

Assume in this example that the merchant or user-set rules require a photo and voice sample from the smartphone user. A request for the photo and voice sample is sent from the kiosk to the smartphone (303). Upon receiving the request, in response to the request of a photo of the smartphone user to be captured, the smartphone activates the camera of the smartphone. In response to the request of a voice sample of the smartphone user to be captured, the smartphone activates the microphone of the smartphone. Other functionalities of the smartphone may also be activated according to the unique identifier requested to be captured. Once the requested photo and voice sample are captured, the smartphone sends the captured data to the kiosk. For example, the photo may be sent as an image file, and the voice sample may be sent as an audio file.

Upon receiving the captured data comprising the photo and voice sample by the kiosk (304), the kiosk determines whether the photo and voice sample satisfy the requirement set forth in the rules (305). For example, the kiosk may determine whether the photo is in the correct format or whether the voice sample is of sufficient length. Once the kiosk determines that the photo and voice sample satisfy the rules, and determines that any other requirements for the purchase transaction are met, the kiosk may complete the purchase transaction. Upon completion, the kiosk associates the photo and voice sample with the record of the purchase transaction (306), and stores the record with the associated photo and voice sample (307). An electronic receipt of the purchase transaction with the photo and the voice sample may be sent from the kiosk to the smartphone (308). This electronic receipt may also be sent to other parties, such as the bank from which the smartphone user's funds are withdrawn for the purchase transaction, or the bank to which the funds are to be deposited.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for obtaining data for a financial transaction between a mobile device and a merchant device, comprising:
   establishing a communication between the merchant device and the mobile device to conduct a financial transaction;
   accessing one or more preset rules comprising one or more user-specified rules setting forth a non-numerical unique identifier required from a mobile device user to complete the financial transaction, wherein the one or more user-specified rules set forth a first type of the required non-numerical unique identifier when an amount of the financial transaction exceeds a threshold amount and a second type of the required non-numerical unique identifier when the amount of the financial transaction does not exceed the threshold amount;
   sending a request for the required non-numerical unique identifier from the merchant device to the mobile device;
   activating, by the mobile device, a hardware of the mobile device corresponding to the first or the second type of the required non-numerical unique identifier;
   capturing, by the mobile device, a non-numerical unique identifier from the mobile device user using the corresponding hardware of the mobile device;
   receiving the captured non-numerical unique identifier from the mobile device user by the merchant device via the mobile device; and
   associating the captured non-numerical unique identifier from the mobile device user with a record of the financial transaction by the merchant device,
   wherein the required non-numerical unique identifier comprises biometric information from the mobile device user,
   wherein the activating of the hardware of the mobile device corresponding to the type of the required non-numerical unique identifier comprises: activating, by the mobile device, a hardware component of the mobile device corresponding to a type of the biometric information,
   wherein the capturing of the non-numerical unique identifier from the mobile device user using the corresponding hardware of the mobile device comprises: capturing, by the mobile device, the biometric information from the mobile device user using the hardware component of the mobile device corresponding to the type of the biometric information.

2. The method of claim 1, further comprising:
   storing the record of the financial transaction with the captured non-numerical unique identifier by the merchant device;
   sending a copy of the stored record with the captured non-numerical unique identifier from the merchant device to the mobile device; and
   retrieving, by the mobile device, the copy of the stored record with the captured non-numerical unique identifier for reporting or analysis.

3. The method of claim 2, further comprising:
   sending a second copy of the stored record with the captured non-numerical unique identifier from the merchant device to a financial institution that is a party to the financial transaction.

4. The method of claim 1, wherein the associating the captured non-numerical unique identifier from the mobile device user with the record of the financial transaction by the merchant device comprises:
   determining that the captured non-numerical unique identifier from the mobile device user satisfies the required non-numerical unique identifier; and
   in response to determining that the captured non-numerical unique identifier from the mobile device user satisfies the required non-numerical unique identifier, associating the captured non-numerical unique identifier from the mobile device user with the record of the financial transaction.

5. The method of claim 1, wherein the merchant device and the mobile device are each a near field communication (NFC) enabled device.

6. The method of claim 1, wherein the accessing of the one or more preset rules comprising the one or more user-specified rules comprises:
   accessing the one or more user-specified rules by the mobile device; and
   sending the one or more user-specified rules to the merchant device by the mobile device.

7. The method of claim 1, wherein the required non-numerical unique identifier comprises a photo of the mobile device user,
   wherein the activating of the hardware of the mobile device corresponding to the type of the required non-numerical unique identifier comprises: activating, by the mobile device, a camera of the mobile device,
   wherein the capturing of the non-numerical unique identifier from the mobile device user using the corresponding hardware of the mobile device comprises: capturing, by the mobile device, the photo of the mobile device user using the camera of the mobile device.

8. The method of claim 1, wherein the required non-numerical unique identifier comprises a voice sample from the mobile device user,
   wherein the activating of the hardware of the mobile device corresponding to the type of the required non-numerical unique identifier comprises: activating, by the mobile device, a microphone of the mobile device,
   wherein the capturing of the non-numerical unique identifier from the mobile device user using the corresponding hardware of the mobile device comprises: capturing, by the mobile device, the voice sample from the mobile device user using the microphone of the mobile device.

9. A computer program product for obtaining data for a financial transaction between a mobile device and a merchant device, the computer program product comprising:

a non-transitory computer readable medium having computer readable program code embodied therewith, the computer readable program code configured to:

establish a communication between the merchant device and the mobile device to conduct a financial transaction;

access one or more preset rules comprising one or more user-specified rules setting forth a non-numerical unique identifier required from a mobile device user to complete the financial transaction, wherein the one or more user-specified rules set forth a first type of the required non-numerical unique identifier when an amount of the financial transaction exceeds a threshold amount and a second type of the required non-numerical unique identifier when the amount of the financial transaction does not exceed the threshold amount;

send a request for the required non-numerical unique identifier from the merchant device to the mobile device;

activate, by the mobile device, a hardware of the mobile device corresponding to the first or the second type of the required non-numerical unique identifier;

capture, by the mobile device, a non-numerical unique identifier from the mobile device user using the corresponding hardware of the mobile device;

receive the captured non-numerical unique identifier from the mobile device user by the merchant device via the mobile device; and associate the captured non-numerical unique identifier from the mobile device user with a record of the financial transaction, wherein the required non-numerical unique identifier comprises biometric information from the mobile device user, wherein the activating of the hardware of the mobile device corresponding to the type of the required non-numerical unique identifier comprises: activating, by the mobile device, a hardware component of the mobile device corresponding to a type of the biometric information, wherein the capturing of the non-numerical unique identifier from the mobile device user using the corresponding hardware of the mobile device comprises: capturing, by the mobile device, the biometric information from the mobile device user using the hardware component of the mobile device corresponding to the type of the biometric information.

10. The computer program product of claim 9, wherein the computer readable program code is further configured to:

store the record of the financial transaction with the captured non-numerical unique identifier;

send a copy of the stored record with the captured non-numerical unique identifier to the mobile device; and retrieve, by the mobile device, the copy of the stored record with the captured non-numerical unique identifier for reporting or analysis.

11. The computer program product of claim 10, wherein the computer readable program code is further configured to:

send a second copy of the stored record with the captured non-numerical unique identifier to a financial institution that is a party to the financial transaction.

12. The computer program product of claim 9, wherein the computer readable program code configured to associate the captured non-numerical unique identifier from the mobile device user with the record of the financial transaction device is further configured to:

determine that the captured non-numerical unique identifier from the mobile device user satisfies the required non-numerical unique identifier; and in response to determining that the captured non-numerical unique identifier from the mobile device user satisfies the required non-numerical unique identifier, associate the captured non-numerical unique identifier from the mobile device user with the record of the financial transaction.

13. The computer program product of claim 9, wherein the merchant device and the mobile device are each a near field communication (NFC) enabled device.

14. The computer program product of claim 9, wherein the computer readable program code configured to access the one or more preset rules comprising the one or more user-specified rules is further configured to:

access the one or more user-specified rules by the mobile device; and send the one or more user-specified rules to the merchant device by the mobile device.

15. A system comprising: a mobile device; and a merchant device comprising a processor and a computer readable memory, the computer readable memory having computer readable program code embodied therewith and executed by the processor, the computer readable program code configured to:

establish a communication between the merchant device and the mobile device to conduct a financial transaction;

access one or more preset rules comprising one or more user-specified rules setting forth a non-numerical unique identifier required from a mobile device user to complete the financial transaction, wherein the one or more user-specified rules set forth a first type of the required non-numerical unique identifier when an amount of the financial transaction exceeds a threshold amount and a second type of the required non-numerical unique identifier when the amount of the financial transaction does not exceed the threshold amount; and send a request for the required non-numerical unique identifier from the merchant device to the mobile device;

wherein the mobile device comprises a hardware corresponding to the first or the second type of the required non-numerical unique identifier, wherein a non-numerical unique identifier is captured from the mobile device user by the mobile device using the corresponding hardware, wherein the computer readable program code of the merchant device is further configured to:

receive the captured non-numerical unique identifier from the mobile device user by the merchant device via the mobile device; and associate the captured non-numerical unique identifier from the mobile device user with a record of the financial transaction, wherein the required non-numerical unique identifier comprises biometric information from the mobile device user, wherein the activating of the hardware of the mobile device corresponding to the type of the required non-numerical unique identifier comprises: activating, by the mobile device, a hardware component of the mobile device corresponding to a type of the biometric information, wherein the capturing of the non-numerical unique identifier from the mobile device user using the corresponding hardware of the mobile device comprises: capturing, by the mobile device, the biometric information from the mobile device user using the hardware component of the mobile device corresponding to the type of the biometric information.

16. The system of claim 15, wherein the computer readable program code is further configured to:
- store the record of the financial transaction with the captured non-numerical unique identifier;
- send a copy of the stored record with the captured non-numerical unique identifier to the mobile device; and
- retrieve, by the mobile device, the copy of the stored record with the captured non-numerical unique identifier for reporting or analysis.

17. The system of claim 15, wherein the computer readable program code configured to associate the captured non-numerical unique identifier from the mobile device user with the record of the financial transaction device is further configured to:
- determine that the captured non-numerical unique identifier from the mobile device user satisfies the required non-numerical unique identifier; and
- in response to determining that the captured non-numerical unique identifier from the mobile device user satisfies the required non-numerical unique identifier, associate the captured non-numerical unique identifier from the mobile device user with the record of the financial transaction.

18. The system of claim 16, wherein the computer readable program code is further configured to:
- send a second copy of the stored record with the captured non-numerical unique identifier to a financial institution that is a party to the financial transaction.

19. The system of claim 15, wherein the computer readable program code configured to access the one or more preset rules comprising the one or more user-specified rules is further configured to:
- access the one or more user-specified rules by the mobile device; and
- send the one or more user-specified rules to the merchant device by the mobile device.

* * * * *